United States Patent
Voss

[19]

[11] Patent Number: 6,145,562
[45] Date of Patent: Nov. 14, 2000

[54] WELDING CYLINDER

[75] Inventor: Hans-Ludwig Voss, Tecklenburg, Germany

[73] Assignee: Windmoller & Holscher, Lengerich, Germany

[21] Appl. No.: 09/244,981

[22] Filed: Feb. 4, 1999

[30] Foreign Application Priority Data

Feb. 6, 1998 [DE] Germany ............................ 198 04 736

[51] Int. Cl.⁷ ...................................................... B30B 5/04
[52] U.S. Cl. ........................ 156/553; 156/582; 156/583.5; 156/555
[58] Field of Search ...................................... 156/209, 553, 156/555, 580, 582, 583.1, 583.5; 100/328, 331

[56] References Cited

U.S. PATENT DOCUMENTS

| | | | |
|---|---|---|---|
| 3,844,091 | 10/1974 | Vedvik et al. ......................... | 156/583.1 |
| 3,855,025 | 12/1974 | Bosse ....................................... | 156/582 |
| 3,996,093 | 12/1976 | Winnemoller ........................... | 156/358 |
| 4,642,084 | 2/1987 | Gietman, Jr. ............................ | 493/190 |
| 5,686,168 | 11/1997 | Laurent et al. .......................... | 428/179 |

FOREIGN PATENT DOCUMENTS 2 162 789  3/1974  Germany.

*Primary Examiner*—James Sells
*Attorney, Agent, or Firm*—Jacobson, Price, Holman & Stern, PLLC

[57] ABSTRACT

Mounted in a frame is a welding cylinder, which is provided with a rotary drive and welding bars, which are distributed at uniform angular distances over the circumference, run parallel to the axis of rotation, can be adjusted continuously in their radial direction by means of their supports, and can be moved in and out in the radial direction relative to their supports for the purpose of activation and deactivation. For the purpose of identifying the respective welding bar, which has executed a specific weld on a film tube passing through, an embossing die, which provides the welded web with a distinct marking, characterizing the welding bar, which has executed the respective weld, is mounted in the circumferential direction in front of or behind each welding bar.

5 Claims, 3 Drawing Sheets

WELDING CYLINDER

The invention relates to a welding cylinder, which is mounted in a frame and has a rotary drive and welding bars, which are distributed at uniform angular distances over the circumference, run parallel to the axis of rotation, can be adjusted continuously in the radial direction by means of their supports, and can be moved in and out in the radial direction relative to their supports for the purpose of activation and deactivation.

Such a welding cylinder, which enables cross welds to be executed on tubular films or double film webs at a welding distance, which covers a large area of adjustment, by suitably activating and/or deactivating the welding bars with a relatively slight enlargement of the welding cylinder's diameter, is disclosed in the DE-PS 21 62 789. If, for example, the welding cylinder exhibits five welding bars, which are distributed over its circumference and are switched in such a manner as a function of the portion of the welds that every second welding bar engages in succession, then the first, third, fifth, second, fourth, first, third welding bar and so forth execute in succession the welds. Then one could no longer clearly detect on the tubular film web or double film web, provided with welds, which of the welding bars executed the individual welds. If, however, individual welds have been poorly executed, it is necessary to identify the welding bar, which executed the defective weld, in order to make the necessary repair or replacement of said bar.

Therefore, the object of the invention is to provide a welding cylinder of the type described in the introductory part, where the cross welds that it executed can be clearly assigned to the welding bar, from which they originate.

The invention solves this problem in that an embossing die, which provides the welded web with a distinct marking, characterizing the welding bar, which has executed the respective weld, is mounted in the circumferential direction in front of or behind each welding bar. With the marking one can then clearly determine which welding bar has executed each of the cross welds.

The markings can consist of dots, whose number is equivalent to the ordinal number, assigned to each welding bar. If the welding cylinder is provided preferably with five welding bars, the embossing dies execute one to five embossed dots.

One inventive improvement, for which independent protection is claimed, provides that, to execute parallel welds, each welding bar, which is provided with two parallel welding strips or welding surfaces, can be locked and swivelled in such a manner around an axis parallel to the welding cylinder's axis of rotation that only one welding strip or one welding surface executes a weld. In this manner the welding cylinder can be easily retrofitted in such a manner that each welding bar executes only one weld, a feature that is necessary, for example, to produce bags with one bottom weld, or that each welding bar executes two parallel welds so that, starting from a semi-tubular web, bags can be produced where the double welds are the side-by-side side welds of bags.

If to execute the welds, which lie parallel side-by-side, the weld bars are provided with two parallel welding strips or welding surfaces, it is expedient that an embossing die be assigned to each of the two welding strips or welding surfaces, in order to be able to identify also the welding strips or the welding surface, which executed one of the two parallel welds.

Expediently each welding bar is enveloped by a U-shaped housing, whose edges are provided with nubs that execute the embossings.

The nubs can consist of the ends of screws, which are screwed into the edges of the housing.

One embodiment of the invention is explained below with reference to the drawing.

Figure 1:
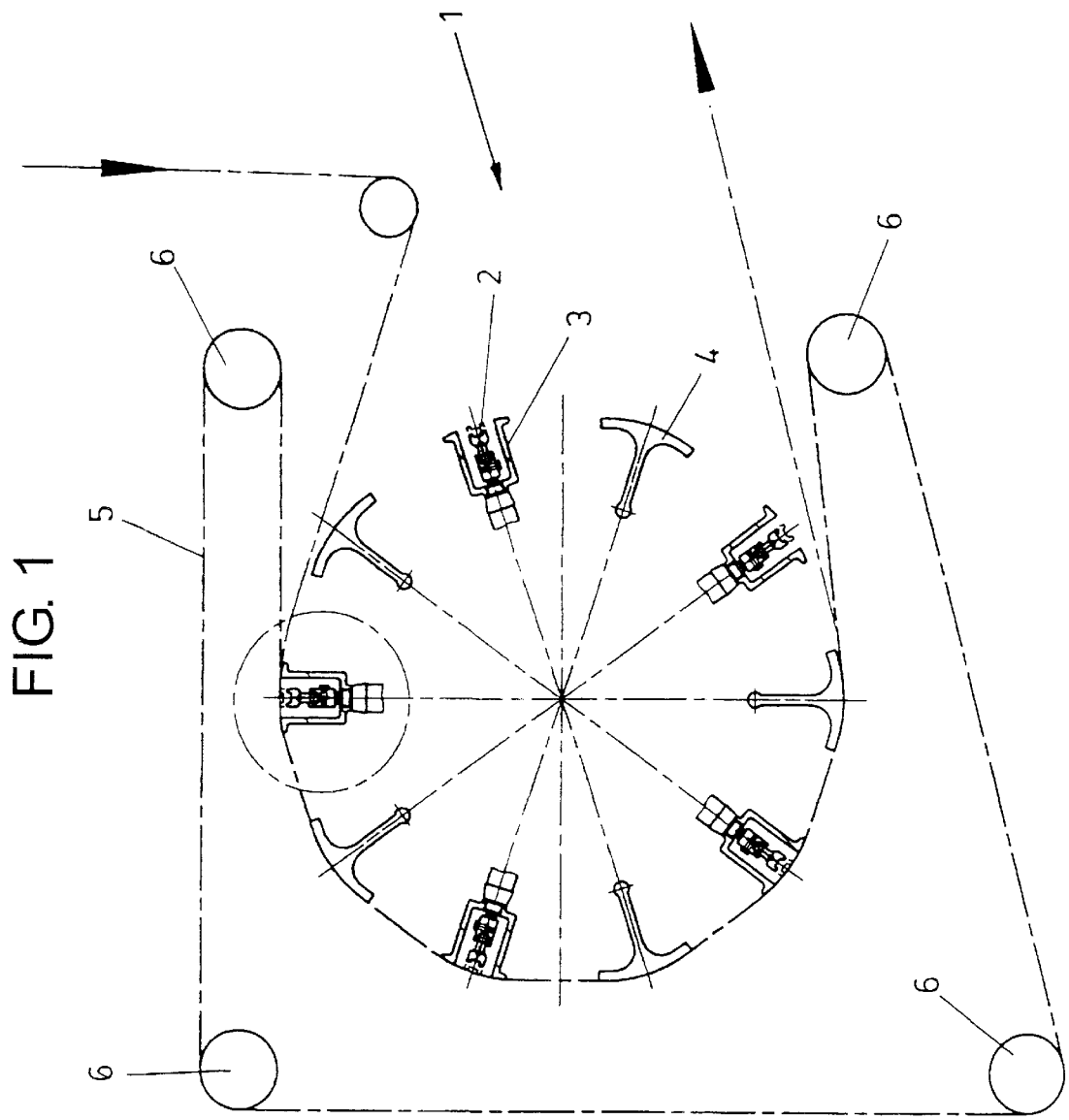
FIG. 1 is a side view of the welding cylinder in a schematic drawing.

FIG. 1 is a schematic drawing of a welding cylinder 1, which is mounted in a machine frame (not illustrated) and provided with a rotary drive; said welding cylinder exhibits five welding bars 2, which are distributed at equal angular distances over its circumference and are enclosed by U-shaped housings 3, and exhibits bracing members 4 between said bars.

The welding cylinder 1, the welding bars 2, the housings 3, the bracing members 4, and their common adjusting drive are designed in principle in the same manner as described in the DE-PS 21 62 789 so that reference is made to this publication for a more detailed description.

The pressure strand of a continuous pressure belt 5 is looped around the welding bars 2, which can be moved with their housings 3 in the radial direction by a method that is not illustrated, and the bracing members 4; the loose side of said pressure belt travels over guide rolls 6 and the rollers of a web storage (not illustrated).

Figure 2:
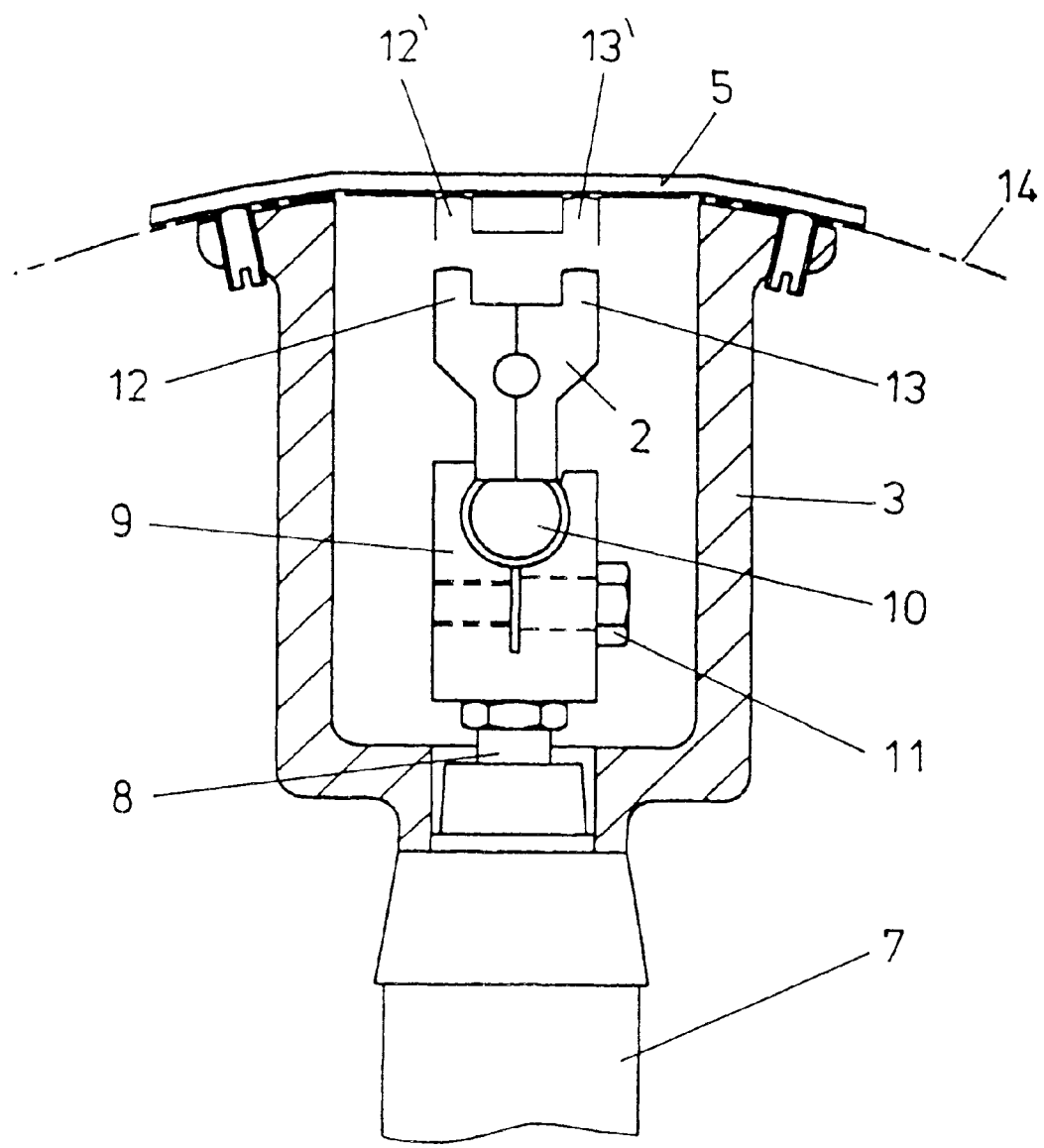
FIG. 2 is a cross section of a housing with the welding bar, mounted in said housing, in a position, in which two welding surfaces of the welding bar can execute cross welds.

As evident from FIG. 2, the U-shaped welding housings 3, enclosing the welding bars 2, are attached to pneumatic cylinders 7, which in turn are attached to supports (not illustrated), which can be adjusted continuously in the radial direction in order to adjust the desired distance between the cross welds to be executed.

Figure 3:
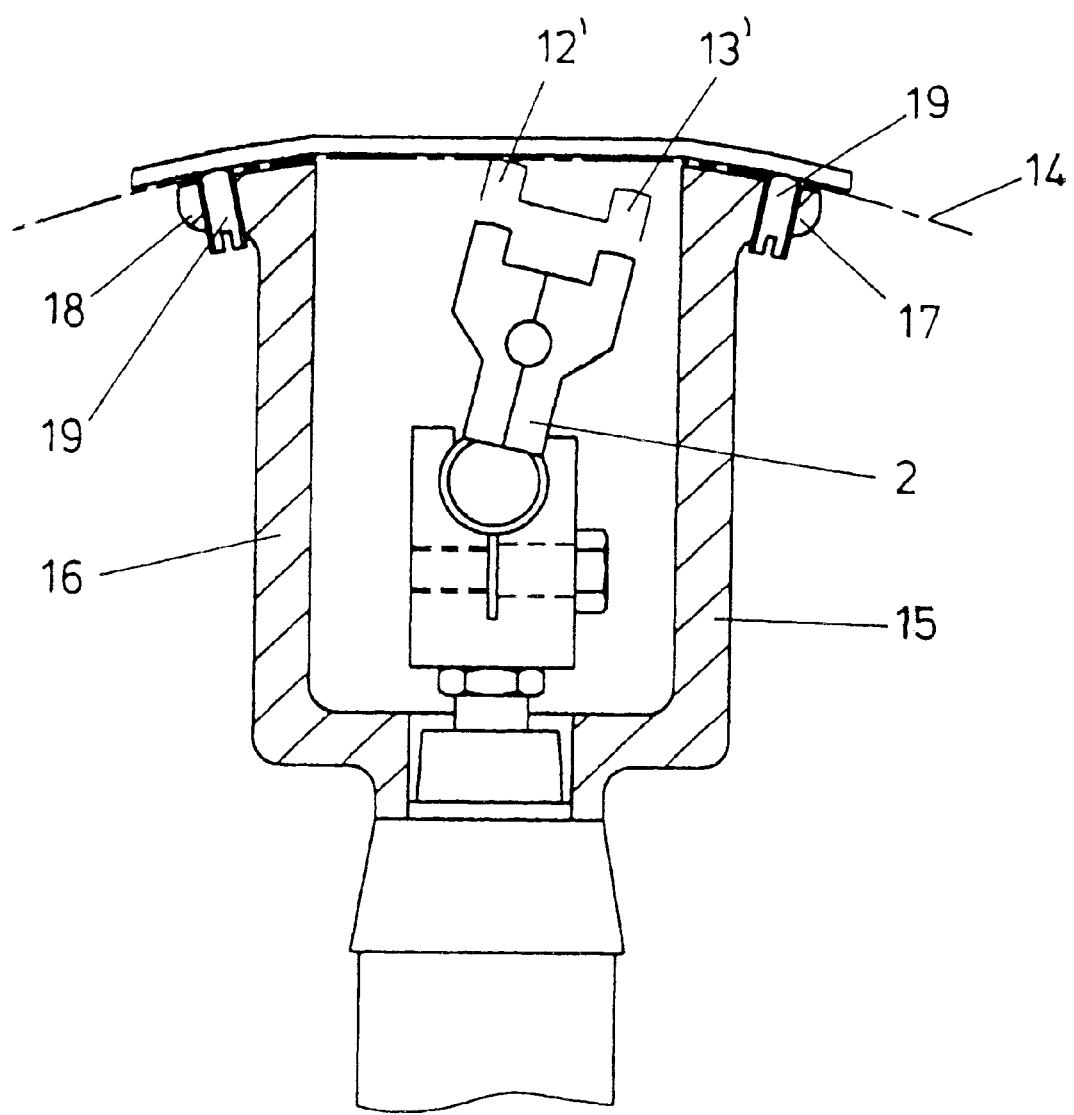
FIG. 3 is a drawing, according to FIG. 2, in which the welding bar can be swivelled sideways in such a manner in its mounting that only one of the two welding surfaces executes cross welds on the web to be welded.

The free ends of the piston rods 8 of the pneumatic cylinders 7 bear shims 9, in which the welding bars 2 are held in such a manner by round rods 10 that they can be swivelled sideways out of the position, which is shown in FIG. 2 and in which the central planes of the welding bars 2 align with the central lines of the pneumatic cylinders, into the position, shown in FIG. 3. The welding bars 2 can be swivelled by loosening the clamping screw 11 of the shim 9 and tightening again after the desired adjustment of the welding bar 2.

The upper free end of each welding bar is provided in the manner, evident from FIGS. 2 and 3, with two welding strips 12, 13, which are spaced apart. By suitably moving the piston rod 8 in and out, these welding strips can be moved out of the illustrated retracted position into the indicated extended position 12', 13', where they lie approximately in the plane of the side edges of the housing 3 or project slightly beyond them. In the extended position shown in FIG. 3, the welding strips 12', 13' execute parallel spaced double welds on the tubular film web 14, which is pushed against said strips by the pressure belt 5.

In the sideways swivelled position of the welding bar 2, shown in FIG. 3, only the welding strip 12' executes a single cross weld, because in the extended position the welding strip 13 is swivelled so far to the side that it can no longer reach the tubular film web 14, to be welded, in order to carry out a weld.

The welding surfaces of the welding strips 12, 13 are rounded off so that in the position, where the welding strip 12' is swivelled to the side as shown in FIG. 3, said welding strip can execute a flawless cross weld.

The upper edges of the side walls 15, 16 of the housing 3 are provided with these widened bends 17, which are provided with threaded boreholes, into which setscrews 19 are screwed with rounded off ends that project over the edges and which form embossing dies for the tubular film web 14 passing through. The ends of the screws 19 form flat cup-shaped depressions, which remain in the tubular plastic film web 14 and by means of which the welding strips 12, 13, which have executed the weld characterized by the embossing, are identified.

Such a number of setscrews 19 are screwed into the widened edges 17, 18 that are equivalent to the predetermined ordinal number of the respective welding strip 12, 13 of the welding bar 2.

A teflon or silicone cloth, as described, for example, in the DE-PS 21 62 789, is stretched over the edges 17, 18 of the housing 3. Therefore, the screws, formed by the ends of the setscrews 19, or embossing dies punch their markings through the teflon or silicone cloth.

What is claimed is:

1. Welding cylinder (1), which is mounted in a frame and has a rotary drive and welding bars (2), which are distributed at uniform angular distances over the circumference, run parallel to the axis of rotation, can be adjusted continuously in their radial direction by means of their supports, and can be moved in and out in the radial direction relative to their supports for the purpose of activation and deactivation, characterized in that an embossing die (19), which provides the welded web with a distinct marking, characterizing the welding bar, which has executed the respective weld, is mounted in the circumferential direction in front of or behind each welding bar (2).

2. Welding cylinder, especially as claimed in claim 1, characterized in that, to execute two parallel welds, each welding bar (2), which is provided with two parallel welding strips (12, 13) or two parallel welding surfaces, can be locked and swivelled in such a manner around an axis parallel to the welding cylinder's (1) axis of rotation that only one welding strip (12') or one welding surface executes a weld.

3. Welding cylinder, as claimed in claim 1, characterized in that an embossing die (19) is assigned to each of the two welding strips (12, 13) or welding surfaces.

4. Welding cylinder, as claimed in claim 1, characterized in that each welding bar (2) is enveloped by a U-shaped housing (3), whose edges (17, 18) are provided with nubs (19) that execute the embossings.

5. Welding cylinder, as claimed in claim 1, characterized in that the nubs constitute the ends of screws (19), which are screwed into the housing edges (17, 18).

* * * * *